C. E. WAKEMAN,

Assignor of one-half to P. A. HITCHCOCK.

Knit Fabric and Stocking.

No. 9,550. Reissued Feb. 1, 1881.

Witnesses:
Chas. S. Hyer
Geo. H. Beale

Inventor:
Chas. E. Wakeman
by his Attorneys Eiler & Dodlick

N. PETERS, PHOTO-LITHOGRAPHER, WASHINGTON, D. C.

UNITED STATES PATENT OFFICE.

CHARLES E. WAKEMAN, OF PONTIAC, MICHIGAN, ASSIGNOR OF ONE-HALF TO P. A. HITCHCOCK, OF SAME PLACE.

KNIT FABRIC AND STOCKING.

SPECIFICATION forming part of Reissued Letters Patent No. 9,550, dated February 1, 1881.

Original No. 174,339, dated February 29, 1876; Reissue No. 8,353, dated July 30, 1878. Application for reissue filed November 23, 1880.

*To all whom it may concern:*

Be it known that I, CHAS. E. WAKEMAN, of Pontiac, in the county of Oakland and State of Michigan, have invented certain new and useful Improvements in Knit Fabrics and Stockings; and I do hereby declare that the following is a full, clear, and exact description thereof, reference being had to the accompanying drawings, and to the letters of reference marked thereon, which form a part of this specification.

My invention consists in a fulled knit woolen fabric provided with a lining of woolen loops designed to be used as will be hereinafter more fully set forth.

In order to enable others skilled in the art to which my invention appertains to make and use the same, I will now proceed to describe its construction and operation, referring to the annexed drawings, in which—

Figure 1:
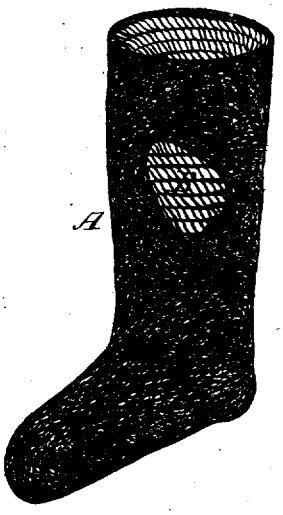
Figure 2:
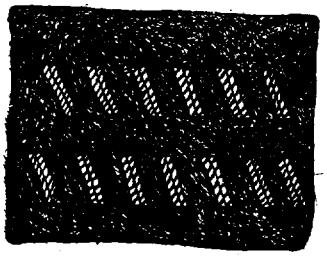

Figure 1 is a side view of a stocking embodying my invention. Fig. 2 shows a piece of the goods.

To illustrate an article made in accordance with my invention, A represents a woolen sock made on an ordinary knitting-machine in the usual manner. This stocking is then placed in an ordinary fulling-machine and there manipulated in the manner usual to such machines, whereby the same is fulled and thickened, forming a nap on the outside and inside thereof. While still wet from the fulling the sock is drawn upon a flat pattern-board having the general outline of the human leg and foot and left to dry upon such pattern-board, so that the dry fulled sock will be shaped to conform to the general contour of the foot and leg. After the stocking has been fulled and shaped it is lined throughout by means of a series of circumferential rows of woolen loops, B, sewed in by hand or otherwise, as shown, forming a soft, yielding, and pliable lining.

Socks thus made may be used without shoes by attaching a sole of buckskin or other suitable material to the under side of the foot.

Having thus fully described my invention, what I claim as new, and desire to secure by Letters Patent, is—

1. As a new article of manufacture, a fulled knit fabric provided with a lining of woolen loops, constructed substantially for the purpose and in the manner herein described.

2. As a new article of manufacture, a fulled knit stocking provided with a seamless leg and a seamless foot with a lining of woolen loops, and shaped to correspond with the general contour of the foot and leg, substantially as described.

CHARLES E. WAKEMAN.

Witnesses:
W. H. DOOLITTLE,
CHARLES S. HYER.